United States Patent Office 3,285,798
Patented Nov. 15, 1966

3,285,798
CHEMICAL COMPOSITION, PROCESS USING SAME AND RESULTING PRODUCT
Giuliana C. Tesoro, Dobbs Ferry, N.Y., assignor to J. P. Stevens & Co., Inc., New York, N.Y., a corporation of Delaware
No Drawing. Filed June 6, 1962, Ser. No. 200,351
15 Claims. (Cl. 161—92)

The present invention relates to laminated or coated fabrics and fibrous materials and processes for making same and, more particularly, to novel adhesive coating compositions which provide excellent anchoring or bonding agents for bonding vinyl resins to textile fabrics and fibrous materials.

Textile structures coated or laminated with resins occupy a unique position in the treatment of fiber arts because they exhibit certain combinations of functional properties which cannot be achieved by either the textile or the resin alone. Thus, for example the textile structure reinforces the resin, enhancing its tensile and tear strength, while the resin film imparts mildew resistance, water repellency, and other desirable properties to the product obtained by coating or laminating textile materials. Coated and laminated fabrics have enjoyed commerical acceptance for such end products as protective clothing, overshoes, upholstery materials, wading pools and the like.

The laminated products are formed by adhering a resin film or coating to one or both sides of a textile surface. For a successful and satisfactory product to be formed, it is essential that there be a strong adhesive bond between the resin film or coating and the textile fiber. Lack of satisfactory adhesion will result in cracking and peeling of the resin and consequent failure of the product.

Forming a satisfactory resin-textile laminate having a strong adhesive bond becomes a problem when the textile structure contains or consists of hydrophobic fibers. Polyamide and polyester fibers are the preferred materials for the manufacture of textiles which are to be coated and/or laminated with vinyl resins since the superior strength and resistance to chemical attack of the hydrophobic fibers are important factors which contribute greatly to the usefulness of the end product. However, when textile structures manufactured from hydrophobic fibers, including yarns, fabrics, scrims, and the like are coated or laminated with a vinyl resin, without any previous chemical processing of the structures, the resin does not adhere to the fibrous structure and the peel strength is less than one pound per two inch strip.

It is known in the art to treat the hydrophobic textile structures with various chemical agents prior to lamination in order to provide a stronger bond between the resin and the textile fibers. However, the adhesive strength obtained from such treatments is in the order of from 2 to 3 pounds per two inch strip which, while sufficient for some end uses, still falls short of the desired strength level. Furthermore, many of these agents are applied in organic solvents which introduces a safety hazard because of their flammability, toxicity, odors, and the like, all of which are detrimental in any commercial operation of the process.

In an effort to further increase the adhesive strength of the bond, the addition of reactive compounds to the treating solution has been suggested. One group of compounds are the polyisocyanates which do give moderate improvements in the strength of the adhesive bond. However, the reactivity of these isocyanates is such that they must be used in water-free organic solvents, and thus have many of the disadvantages enumerated above. A further disadvantage is that a high solids content of the chemical treating agent by weight of textile structure must be deposited on the structure in order to achieve useful adhesive strengths in subsequent lamination and coating processes.

Accordingly, it is an object of this invention to obviate the above disadvantages existing in vinyl resin-hydrophobic textile laminates and in processes for making the same.

It is another object of this invention to provide a process for forming a vinyl resin-hydrophobic textile laminate having superior adhesive bonding properties of resin to fibers than heretofore possible.

A further object of this invention is to provide novel coating compositions for treating fibrous textile materials which do not involve the use of organic solvents.

Still another object of this invention is to provide novel coating compositions which will yield coated products having improved adhesive strengths when laminated to vinyl resin films.

A further object of this invention is to provide novel adhesive tie-coat compositions for use in bonding vinyl resin film to synthetic fibers of the polyamide and polyester type.

Still a further object of this invention is to provide aqueous vinyl resin dispersions suitable as tie-coats for bonding vinyl films to textile fabrics coated therewith wherein the percentage of total solids on weight of fabric is considerably less than for solvent based systems for equivalent adhesive strengths.

In attaining the foregoing objects, one feature of the invention resides in treating the textile structure with a coating composition comprising an aqueous dispersion of a vinyl resin, and an aziridine compound having at least two aziridinyl groups, prior to laminating the structure with a vinyl resin.

Further objects, features and advantages of the invention will become further apparent hereinafter as the description proceeds.

Vinyl resin latexes prepared by emulsion polymerization of the appropriate monomers, or by dispersing bulk polymer or powdered resin in water, are suitable for use in the preparation of the coating compositions of this invention. Among the many resin types commercially available in latex form which can be employed are polyvinyl acetate, polyvinyl chloride, mixtures thereof, vinyl chloride-vinyl acetate copolymers, maleic acid-modified vinyl chloride-vinyl acetate copolymers, partially hydrolyzed vinyl chloride-vinyl acetate copolymers, vinylidene chloride copolymers and the like. Included among the polyvinyl chloride resins are those sold by the B. F. Goodrich Co. under the trademarks Geon 121, Geon 351, Geon 576, Geon 652, Geon 400X110 and Geon 450X167.

As the plasticizer component of the coating compositions of this invention any of the known vinyl-type plasticizers can be readily employed, although the phthalates, such as dioctyl phthalate, and epoxy plasticizers are preferred. Included among the latter is the polymeric epoxy-type plasticizer sold under the trademark Peroxidol P-780 by the Reichhold Chemical Co.

The aziridine components useful in the manufacture of the coating composition of the invention are those compounds which have at least two aziridinyl groupings in their molecules and have the following formula:

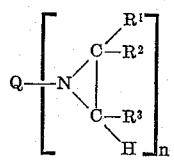

wherein $R^1$, $R^2$ and $R^3$ represent hydrogen or lower alkyl groups, Q is an organic or inorganic radical and $n$ is a positive whole number having a value of at least 2.

Representative aziridines containing at least two aziridinyl groupings and within the scope of this invention include:

(a) The preferred compounds of the invention having the formula:

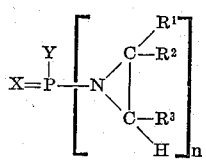

wherein $R^1$, $R^2$ and $R^3$ represent hydrogen and lower alkyl groups, X is either sulfur or oxygen, $n$ is either 2 or 3 but when $n$ is three, Y is absent from the molecule and when $n$ is two Y is either an alkyl, preferably a lower alkyl, group or a dialkyl amino group wherein the alkyl members are again preferably lower alkyl groups. Coming within the scope of this invention are the following compounds: tris(1-aziridinyl) phosphine oxide; tris-[1-(2-methyl)aziridinyl] phosphine oxide; tris(1-aziridinyl) phosphine sulfide:

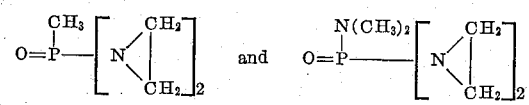

(b) those derived by the reaction of an ethylene imine and organic dihalides characterized by the formula:

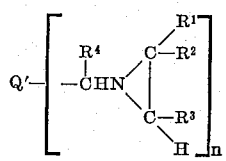

wherein $R^1$, $R^2$, $R^3$ and $R^4$ represent members selected from the group consisting of hydrogen and lower alkyls and $n$ represents an integer having a value of 2 through 3 and Q′ represents an aliphatic, aromatic or alkaromatic radical. By the term lower alkyls is meant to include alkyls having from 1 to about 6 carbon atoms although alkyls having from 1–4 carbon atoms are preferred in the aziridines of the present invention.

(c) the polyalkylene polyether diaziridines characterized by the formula:

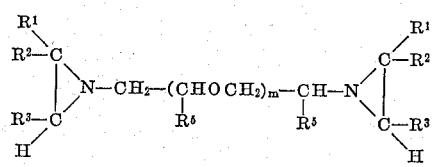

wherein $R^1$, $R^2$ and $R^3$ have the same meaning as above, $R^5$ represents hydrogen or methyl and $m$ represents an integer having an average value of from 1 through 50. Representative polyalkylene polyether diaziridines include those derived from diethylene glycol, triethylene glycol, tetraethylene glycol, pentaethylene glycol, heptaethylene glycol, hexaethylene glycol, decaethylene glycol, dodecaethylene glycol as well as those derived from polypropylene glycols and corresponding to the above formula when $R^5$ is methyl.

(d) Diaziridines derived from organic alkylene dihalides and characterized by the formula:

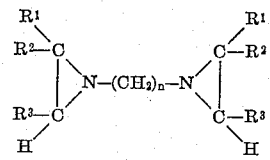

where $n$ represents a whole positive integer having a value in the range of 1 to 18 and preferably from 1 to 10. Typical alkylene bis-aziridines include such compounds as 1,2-ethylene bis-aziridine; 1,2-propylene bis-aziridine; 1,6-hexylene bis-aziridine and the like.

(e) Other aziridines containing at least two aziridinyl groups in the molecule and useful in manufacturing the compositions of the invention are those prepared by reacting an ethylene imine and substituted and unsubstituted halomethyl aromatic hydrocarbons such as xylylene dihalides $[C_6H_4(CH_2X)_2]$, bis-halomethyl alkylated benzenes, halomethyl naphthalenes, halomethyl alkylated naphthalenes and the like and include representative compounds such as meta-bis-aziridino-diisopropyl benzene.

The method of preparing the aforesaid aziridines is more specifically set forth in the copending application, Serial No. 94,720, filed March 10, 1961 and entitled "Aziridine Compounds and Method of Preparing Same," and this method is incorporated herewith by reference.

While the invention broadly relates to the use of compounds having at least two aziridinyl groups per molecule, it will be further discussed and exemplified in terms of the preferred compounds of the formula:

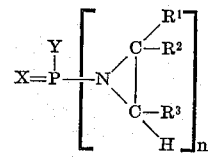

as defined above.

The proportions of the components of the novel coating compositions of the invention are not narrowly critical and the specific amounts of each component required for optimum performance will depend greatly on the structure of the textile material to be treated and on the adhesive strength requirements of the treated product in its ultimate end use. Generally speaking, it has been observed that the adhesive strength increases with increasing amounts of adhesive composition applied to the textile when the ratios of resin solids in the latex to plasticizer to aziridine are in the range of from 5 to 50 percent by weight of plasticizer and from 2 to 20 percent by weight of aziridine based on the wight of resin. Optionally, the formulations can include stabilizers in amounts preferably ranging from 1 to 10 percent by weight based on the amount of resin. Typical stabilizers include polyvinyl alcohol and ammonium caseinate.

Any convenient means can be employed in preparing the coating compositions of this invention as by mixing the required ingredients together at room temperature prior to use. It is preferred however, to prepare an emulsion of the plasticizer in water first and then add this emulsion to the resin latex to be modified after diluting the unplasticized latex with water to the desired concentration. It may be, in some cases, that the latex itself contains enough extra emulsifying agent so that the plasticizer can be added directly to the latex, with stirring, an emulsion being formed during the process. In either case, it is preferred that the emulsion be allowed to age for about 24 hours, prior to use whereupon the arizidine and stabilizer, if desired, are added to the composition.

The coatings based upon the compositions of this invention can be applied by any of the normal commercial methods such as spraying, roller coating and dipping. It is preferred, however, to pad a textile material or structure with a coating composition having the desired concentration, drying the same and subsequently curing at temperatures in the range of from about 250° F. to about 375° F. for a period of time of from about one to seven minutes. Very good results have been obtained by curing for five minutes at a temperature of 300–320° F. The preferred dry pickup of the treated textile structure is about 25–30% based on the weight of the structure and the amount of vinyl resin cured on the structure can readily be calculated. Satisfactory results are also obtained when the dry pickup is from about 15–40% based upon the weight of the treated structure.

The coated fabric or fibrous material prepared in this manner exhibits excellent adhesive strengths when laminated with a vinyl film and does not peel or crack after much flexing, indicating that the coating compositions of the invention provide excellent anchorage or tie-coats. The adhesive strength of the treated textile to the vinyl resin film can be readily increased by a factor of 100 to 250%, by the method and composition of the invention, without requiring the use of additional additives.

Included in the meaning of the term "textile structures" are textile products such as continuous filaments, staple yarns, thread, cord, fabrics and scrims. The textile structure which may be treated in accordance with the present invention are those consisting entirely of hydrophobic fibers and also those consisting of blends of hydrophobic fibers with other fibers, either natural or synthetic. With the term "hydrophobic" are included the polyamide fibers (commonly referred to as nylon) polyester fibers (including those sold under the trademark Dacron by E. I. du Pont de Nemours & Co.), polyolefin fibers, acrylic fibers, acrylonitrile fibers (including those sold under the trademark Orlon by E. I. du Pont de Nemours & Co.) and the like. These hydrophobic structures are more fully described in U.S. Patent 2,982,751 and the description thereof is incorporated herein by reference.

In the foregoing specification reference is made to adhesive strength in terms of pounds per two inch strip. These measurements were made in accordance with the method 5950, CCC-T-191b described in "Federal Specification-Textile Test Methods"—General Services Administration, Business Service Center, Washington, D. C.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

*Example I*

An adhesive composition was prepared by diluting 61.5 parts of an unplasticized polyvinyl chloride latex having a solids content of 57 percent with 16.5 parts of water and adding 2.7 parts of a 65 percent emulsion of dioctyl phthalate (prepared from 65.0 parts of dioctyl phthalate, 1.25 parts of allic acid, 33.4 parts of water and 0.35 part of ammonia). 8.25 parts of a tris(1-aziridinyl) phosphine oxide solution (prepared from 50 parts of 85 percent tris(1-aziridinyl) phosphine oxide and 50 parts of water) and 14.0 parts of a 10.2 percent polyvinyl alcohol solution. A piece of nylon scrim fabric (22 x 22 count) was impregnated with this solution by passing through the rolls of a padder set at such a pressure as to provide a 60 weight percent wet pickup. The nylon scrim fabric was then framed to the original dimensions, dried and cured for five minutes at a temperature of 300° F. The nylon scrim fabric so processed was laminated on one side with a vinyl film by applying sufficient heat and pressure, tested and found to have an adhesive strength of 12.0 pounds per 2 inch strip. This compared favorably with the adhesive strength of 0.4 pound per 2 inch strip for untreated fabric and an adhesive strength of 2.6 pounds per 2 inch strip for fabric treated with the polyvinyl chloride latex and plasticizer only.

A two-faced or sandwich lamination was then prepared and tested and found to have an adhesive strength of 14.8 pounds per two inch strip which again compared favorably to sandwich laminations prepared from untreated fabric and fabric treated with polyvinyl chloride and plasticizer only and which were found to have adhesive strengths of 4.0 pounds per two inch strip and 7.0 pounds per two inch strip respectively.

*Example II*

An adhesive composition was prepared by diluting 29.5 parts of a plasticized polyvinyl chloride latex having a solids content of 55.9 percent with 66.5 parts of water and 4.0 parts of tris(1-aziridinyl) phosphine oxide solution (prepared by mixing 2.0 parts of 85 percent tris(1-aziridinyl) phosphine oxide with 2.0 parts of water). A piece of tightly-woven Dacron polyester fabric was impregnated with this solution by passing through the rolls of a padder set at such a pressure as to provide a 55 percent wet pickup. The polyester fabric was then framed, dried and cured for 2 minutes at a temperature of 320° F. When the polyester fabric so processed was dip-coated with a vinyl organosol which was then cured thereon by the application of heat, the resulting coated product did not exhibit cracking or peeling even after prolonged flexing whereas the vinyl coating resulting from dip-coating an untreated fabric could be easily removed by simple scratching.

*Examples III–VI*

The procedure of Example I was repeated except for the following changes in the adhesive compositions below:

(a) 10.0 parts of tris-[1-(2-methyl)aziridinyl] phosphine oxide was used in place of 8.25 parts of the tris(1-aziridinyl) phosphine oxide.

(b) 9.0 parts tris(1-aziridinyl) phosphine sulfide was used in place of tris(1-aziridinyl) phosphine oxide.

(c) ammonium caseinate was used in place of polyvinyl alcohol.

(d) the polyvinyl alcohol was omitted entirely.

The results of testing the materials obtained by following the procedure of Example I with nylon fabrics and scrims, although varying somewhat from composition to composition, were of the same order of magnitude and were highly superior to coatings and laminates prepared from the untreated fabrics.

*Example VII*

The following results, set forth in tabular form, show the laminate adhesive strengths in pounds per two inch strip obtained with various adhesive compositions prepared in accordance with this invention as compared with typical laminates prepared from a solvent system and a laminate prepared from an untreated nylon scrim.

| | Treating Solution | Percent total Solids (OWF) | Curing | Adhesive Strength |
|---|---|---|---|---|
| Untreated nylon scrim | None | 0 | | 0.4 |
| Solvent | 16% polyvinyl chloride resin and 37 phr. of blocked polyisocyanate. | 110 | 10' at 260° F | 11.8 |
| Aqueous Systems: | | | | |
| 1 | 40% plasticized polyvinyl chloride only | 22 | 5' at 300° F | 2.5 |
| 2 | 40% plasticized polyvinyl chloride and 10 phr. of tris (1-aziridinyl)phosphine oxide. | 20.2 | 5' at 300° F | 7.0 |
| 3 | 30% unplasticized polyvinyl chloride, 13 phr. of tris(1-aziridinyl)phosphine oxide and 5 phr. of dioctyl phthalate. | 22 | 5' at 300° F | 10.5 |
| 4 | 40% unplasticized polyvinyl chloride, 5 phr. of dioctyl phthalate, 10 phr. of tris (1-aziridinyl) phosphine oxide and 4 phr. of polyvinyl alcohol. | 17 | 5' at 300° F | 12.3 |

It is apparent from the above summary that the adhesive strength obtained on fabric treated from an aqueous system with the compositions of our invention is even higher than obtained on fabric treated from a solvent system. Furthermore, the amount of resin solids required to give high adhesive strength is only about 17 percent on the weight of the fabric for the compositions of this invention, while it is above 100 percent for the solvent systems generally employed for this purpose.

What is claimed is:

1. A laminated article comprising a hydrophobic fibrous textile material, a continuous heat sealable vinyl film coating layer and an anchoring coating layer therebetween formed from an aqueous dispersion consisting essentially of a vinyl resin, a plasticizer therefor and an aziridine having at least two aziridinyl groups per molecule.

2. The laminated article of claim 1 wherein the aziridine is a tris (1-aziridinyl) phosphine oxide.

3. The laminated article of claim 1 wherein the aziridine is tris(1-aziridinyl) phosphine sulfide.

4. The laminated article of claim 1 wherein the aziridine has the formula

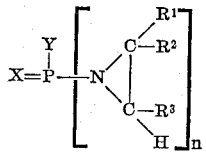

wherein $R^1$, $R^2$ and $R^3$ are members selected from the group consisting of hydrogen and lower alkyl groups, X is a member selected from the group consisting of sulfur and oxygen, $n$ is an integer selected from the group consisting of 2 and 3, and when $n$ is 3, Y is absent from the molecule and when $n$ is 2, Y is a member selected from the group consisting of alkyl and dialkyl amino groups.

5. The laminated article of claim 1 wherein the aziridine is a polyalkylene glycol diaziridine characterized by the formula:

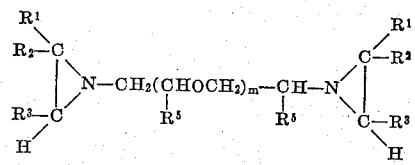

wherein $R^1$, $R^2$, $R^3$ and $R^5$ represent members selected from the group consisting of hydrogen and methyl groups and $m$ represents an integer having an average value of 1–50.

6. The laminated article of claim 1 wherein the aziridine is characterized by the formula:

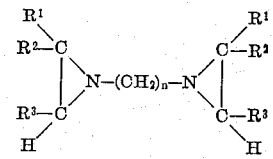

wherein $R^1$, $R^2$ and $R^3$ represent members selected from the group consisting of hydrogen and methyl groups and $n$ represents a whole positive integer having a value in the range of 1 to 18.

7. A laminated article comprising a textile structure containing hydrophobic fibers, a continuous heat sealable vinyl film coating layer, and an anchoring coating layer therebetween, said anchoring coating layer formed from an aqueous dispersion consisting essentially of a vinyl resin, a plasticizer therefor and an aziridine having at least two aziridinyl groups per molecule.

8. A laminated article comprising a textile structure consisting essentially of hydrophobic fibers, a continuous heat sealable vinyl film coating layer and an anchoring coating layer therebetween, said anchoring coating formed from an aqueous dispersion consisting essentially of a vinyl resin, a plasticizer therefor and an aziridine having at least two aziridinyl groups per molecule, said plasticizer being present in an amount of from 5 to 50 percent by weight of said vinyl resin, said aziridine being present in an amount of from 2 to 20% by weight of said vinyl resin.

9. The process of securely bonding a textile structure containing hydrophobic fibers to a vinyl layer whereby said layer will not crack or peel from said structure during flexing of the laminated product, comprising applying to said textile structure an aqueous emulsion consisting essentially of a vinyl resin, a plasticizer therefor and an aziridine having at least two aziridinyl groups per molecule, curing said emulsion on said material, placing a vinyl resin layer into contact with a surface of said textile structure which has said emulsion cured thereon, and applying heat and pressure to the contacting surfaces to seal said vinyl resin layer to said textile structure.

10. The process as defined in claim 9 wherein said aziridine has the formula

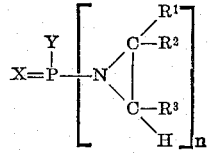

wherein $R^1$, $R^2$ and $R^3$ are members selected from the group consisting of hydrogen and lower alkyl groups, X is a member selected from the group consisting of sulfur and oxygen, $n$ is an integer selected from the group consisting of 2 and 3, and when $n$ is 3, Y is absent from the molecule and when $n$ is 2, Y is a member selected from the group consisting of alkyl and dialkyl amino groups.

11. The process as defined in claim 9 wherein said emulsion is cured on said structure by subjecting said structure to a temperature of from about 250° F. to 375° F. for a time period of about 1 to 7 minutes.

12. The process of securely bonding a textile structure consisting of hydrophobic fibers to a vinyl resin layer whereby said layer will not crack or peel from said structure during flexing of the laminated product, comprising applying to said textile structure an aqueous emulsion of a vinyl resin, a plasticizer therefor and an aziridine having at least two aziridinyl groups per molecule, said plasticizer being present in an amount of from 5 to 50 percent by weight of said vinyl resin, said aziridine being present in an amount of from 2 to 20 percent by weight of said resin, curing said emulsion on said material, placing a vinyl resin layer into contact with a surface of said textile structure which has said emulsion cured thereon, and apply heat and pressure to the contacting surfaces to seal said vinyl resin layer to said textile structure.

13. The process as defined in claim 12 wherein said aziridine has the formula:

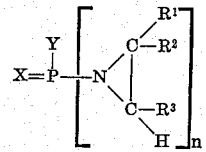

wherein $R^1$, $R^2$ and $R^3$ are members selected from the group consisting of hydrogen and lower alkyl groups, X is a member selected from the group consisting of sulfur and oxygen, $n$ is an integer selected from the group consisting of 2 and 3, and when $n$ is 3, Y is absent from the molecule and when $n$ is 2, Y is a member selected from the group consisting of alkyl and dialkyl amino groups.

14. An adhesive coating composition consisting essentially of an aqueous dispersion of a vinyl resin, a plasticizer therefor and an aziridine characterized by the formula:

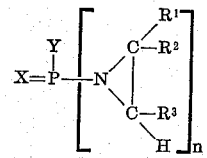

wherein $R^1$, $R^2$ and $R^3$ represent members selected from the group consisting of hydrogen and lower alkyl groups, X is a member selected from the group consisting of sulfur and oxygen, $n$ is an integer from 2 to 3, and when $n$ is 3, Y is absent from the molecule and when $n$ is 2, Y is a member selected from the group consisting of alkyl and dialkyl amino groups.

15. An adhesive coating composition consisting essentially of an aqueous emulsion of a vinyl resin, a plasticizer therefor and an aziridine characterized by the formula:

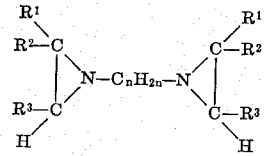

wherein $R^1$, $R^2$ and $R^3$ represent members selected from the group consisting of hydrogen and methyl groups and $n$ represents a whole positive integer having a value in the range of 1 to 18.

References Cited by the Examiner

UNITED STATES PATENTS

| | | | |
|---|---|---|---|
| 2,831,018 | 4/1958 | Trieschmann et al. | 260—490 |
| 2,906,592 | 9/1959 | Reeves et al. | 260—239 X |
| 3,067,085 | 12/1962 | Limperos | 156—327 |
| 3,077,427 | 2/1963 | Hammermesh et al. | 161—191 |
| 3,146,228 | 8/1964 | Chance | 260—239 |
| 3,156,606 | 11/1964 | Blumberg | 161—191 X |

EARL M. BERGERT, *Primary Examiner.*

L. T. PIRKEY, C. B. COSBY, *Assistant Examiners.*